(12) United States Patent
Sethi et al.

(10) Patent No.: US 9,799,000 B2
(45) Date of Patent: Oct. 24, 2017

(54) PREDICTIVE CONVERSION SYSTEMS AND METHODS

(71) Applicant: VAST.COM, INC., Austin, TX (US)

(72) Inventors: Komal Singh Sethi, San Francisco, CA (US); Milos Milinko Tatarevic, Belgrade (RS); Aleksandar Milutin Bradic, Krusevac (RS); Kevin Allen Laws, Belmont, CA (US)

(73) Assignee: VAST.COM, INC., Austin, TX (US)

( * ) Notice: Subject to any disclaimer, the term of this patent is extended or adjusted under 35 U.S.C. 154(b) by 0 days.

(21) Appl. No.: 14/486,993

(22) Filed: Sep. 15, 2014

(65) Prior Publication Data

US 2015/0220876 A1   Aug. 6, 2015

Related U.S. Application Data

(60) Continuation of application No. 13/664,268, filed on Oct. 30, 2012, now Pat. No. 8,868,572, which is a
(Continued)

(51) Int. Cl.
| | |
|---|---|
| G06F 17/30 | (2006.01) |
| G06Q 10/08 | (2012.01) |
| G06Q 30/02 | (2012.01) |

(52) U.S. Cl.
CPC ....... *G06Q 10/087* (2013.01); *G06F 17/3053* (2013.01); *G06F 17/30412* (2013.01);
(Continued)

(58) Field of Classification Search
CPC ................ G06F 17/3053; G06F 17/30867
See application file for complete search history.

(56) References Cited

U.S. PATENT DOCUMENTS 5,459,656 A * 10/1995 Fields .................... G06Q 10/06
                                                      700/104
5,687,322 A    11/1997 Deaton et al.
(Continued)

OTHER PUBLICATIONS

U.S. Appl. No. 13/924,375 including its prosecution history, the cited references, and the Office Actions therein, Not Yet Published, Franke et al.
(Continued)

*Primary Examiner* — Alexey Shmatov
(74) *Attorney, Agent, or Firm* — Knobbe Martens Olson & Bear LLP

(57) ABSTRACT

In one embodiment, a system and method of predicting sale transaction conversion rate of an item operates through a search of information in response to a query over a network. The item can be included in a category of items. Information for other relevant items of the category is available through network query and historical data, among others. Respective information for the other items of the category is available to the method. The system and method includes discovering available information of the item of interest, extracting certain of the available information of the item, analyzing the certain information for the item by comparing the information to other item information for the category of items, weighting the information for the commercial item in comparison to other items of the category, calculating a predictive score for the commercial item of interest, and presenting the information of the commercial item of interest ranked according to the predictive score as compared to other items of the category.

15 Claims, 7 Drawing Sheets

Related U.S. Application Data continuation of application No. 13/357,540, filed on Jan. 24, 2012, now Pat. No. 8,326,845, which is a division of application No. 12/333,124, filed on Dec. 11, 2008, now Pat. No. 8,126,881.

(60) Provisional application No. 61/013,198, filed on Dec. 12, 2007.

(52) U.S. Cl.
CPC .. *G06F 17/30536* (2013.01); *G06F 17/30539* (2013.01); *G06F 17/30554* (2013.01); *G06F 17/30864* (2013.01); *G06F 17/30997* (2013.01); *G06Q 30/02* (2013.01)

(56) References Cited

U.S. PATENT DOCUMENTS

| | | | |
|---|---|---|---|
| 6,029,195 A | 2/2000 | Herz | |
| 6,430,539 B1 | 8/2002 | Lazarus et al. | |
| 6,510,406 B1 | 1/2003 | Marchisio | |
| 6,539,392 B1 | 3/2003 | Rebane | |
| 6,611,726 B1 | 8/2003 | Crosswhite | |
| 6,711,581 B2 | 3/2004 | Rebane | |
| 6,751,600 B1 | 6/2004 | Wolin | |
| 6,751,614 B1 | 6/2004 | Rao | |
| 6,775,664 B2 | 8/2004 | Lang et al. | |
| 6,873,983 B2 | 3/2005 | Ugai et al. | |
| 6,886,005 B2 | 4/2005 | Davis | |
| 7,013,005 B2 | 3/2006 | Yacoub et al. | |
| 7,069,258 B1 | 6/2006 | Bothwell | |
| 7,165,119 B2 | 1/2007 | Fish | |
| 7,167,871 B2 | 1/2007 | Farahat et al. | |
| 7,206,780 B2 | 4/2007 | Slackman | |
| 7,225,107 B2 | 5/2007 | Buxton et al. | |
| 7,243,102 B1 | 7/2007 | Naam et al. | |
| 7,260,568 B2 | 8/2007 | Zhang et al. | |
| 7,283,951 B2 | 10/2007 | Marchisio et al. | |
| 7,293,017 B2 | 11/2007 | Hurst-Hiller et al. | |
| 7,356,430 B2 | 4/2008 | Miguelanez et al. | |
| 7,395,170 B2 | 7/2008 | Scott et al. | |
| 7,398,201 B2 | 7/2008 | Marchisio et al. | |
| 7,433,885 B2 | 10/2008 | Jones | |
| 7,440,955 B2 | 10/2008 | Khandelwal et al. | |
| 7,444,308 B2 | 10/2008 | Guyon et al. | |
| 7,467,232 B2 | 12/2008 | Fish et al. | |
| 7,509,321 B2 | 3/2009 | Wong et al. | |
| 7,523,047 B1 | 4/2009 | Neal et al. | |
| 7,542,947 B2 | 6/2009 | Guyon et al. | |
| 7,565,362 B2 | 7/2009 | Brill et al. | |
| 7,593,904 B1 | 9/2009 | Kirshenbaum et al. | |
| 7,593,934 B2 | 9/2009 | Li et al. | |
| 7,596,552 B2 | 9/2009 | Levy et al. | |
| 7,603,348 B2 | 10/2009 | He et al. | |
| 7,631,008 B2 | 12/2009 | Carson et al. | |
| 7,636,715 B2 | 12/2009 | Kalleh | |
| 7,647,314 B2 | 1/2010 | Sun et al. | |
| 7,657,493 B2 | 2/2010 | Meijer et al. | |
| 7,660,581 B2 | 2/2010 | Ramer et al. | |
| 7,664,746 B2 | 2/2010 | Majumder | |
| 7,672,865 B2 | 3/2010 | Kumar et al. | |
| 7,680,835 B2 | 3/2010 | MacLaurin et al. | |
| 7,685,197 B2 | 3/2010 | Fain et al. | |
| 7,693,818 B2 | 4/2010 | Majumder | |
| 7,693,901 B2 | 4/2010 | Ka et al. | |
| 7,716,202 B2 | 5/2010 | Slackman | |
| 7,716,217 B2 | 5/2010 | Marston et al. | |
| 7,716,225 B1 | 5/2010 | Dean et al. | |
| 7,716,226 B2 | 5/2010 | Barney | |
| 7,725,307 B2 | 5/2010 | Bennett | |
| 7,725,451 B2 | 5/2010 | Jing et al. | |
| 7,739,408 B2 | 6/2010 | Fish et al. | |
| 7,761,447 B2 | 7/2010 | Brill et al. | |
| 7,788,252 B2 | 8/2010 | Delli Santi et al. | |
| 7,801,358 B2 | 9/2010 | Furmaniak et al. | |
| 7,801,843 B2 | 9/2010 | Kumar et al. | |
| 7,802,197 B2 | 9/2010 | Lew et al. | |
| 7,805,331 B2 | 9/2010 | Demir et al. | |
| 7,805,385 B2 | 9/2010 | Steck et al. | |
| 7,805,438 B2 | 9/2010 | Liu et al. | |
| 7,809,740 B2 | 10/2010 | Chung et al. | |
| 7,818,186 B2 | 10/2010 | Bonissone et al. | |
| 7,827,060 B2 | 11/2010 | Wright et al. | |
| 7,827,170 B1 | 11/2010 | Horling et al. | |
| 7,831,463 B2 | 11/2010 | Nagar | |
| 7,836,057 B1 | 11/2010 | Micaelian et al. | |
| 7,849,030 B2 | 12/2010 | Ellingsworth | |
| 7,860,871 B2 | 12/2010 | Ramer et al. | |
| 7,865,187 B2 | 1/2011 | Ramer et al. | |
| 7,865,418 B2 | 1/2011 | Uenohara et al. | |
| 7,870,017 B2 | 1/2011 | Kamath | |
| 7,895,193 B2 | 2/2011 | Cucerzan et al. | |
| 7,899,455 B2 | 3/2011 | Ramer et al. | |
| 7,904,448 B2 | 3/2011 | Chung et al. | |
| 7,908,238 B1 | 3/2011 | Nolet et al. | |
| 7,912,458 B2 | 3/2011 | Ramer et al. | |
| 7,912,713 B2 | 3/2011 | Vair et al. | |
| 7,921,068 B2 | 4/2011 | Guyon et al. | |
| 7,921,069 B2 | 4/2011 | Canny et al. | |
| 7,930,197 B2 | 4/2011 | Ozzie et al. | |
| 7,933,388 B1 | 4/2011 | Vanier et al. | |
| 7,937,345 B2 | 5/2011 | Schmidtler et al. | |
| 7,941,329 B2 | 5/2011 | Kenedy et al. | |
| 7,958,067 B2 | 6/2011 | Schmidtler et al. | |
| 7,966,219 B1 | 6/2011 | Singh et al. | |
| 7,987,261 B2 | 7/2011 | Gamble | |
| 8,001,121 B2 | 8/2011 | Wang et al. | |
| 8,005,643 B2 | 8/2011 | Tunkelang et al. | |
| 8,005,684 B1 | 8/2011 | Cheng et al. | |
| 8,005,774 B2 | 8/2011 | Chapelle | |
| 8,005,826 B1 | 8/2011 | Sahami et al. | |
| 8,015,065 B2 | 9/2011 | Davies | |
| 8,024,327 B2 | 9/2011 | Tunkelang et al. | |
| 8,024,349 B1 | 9/2011 | Shao et al. | |
| 8,027,864 B2 | 9/2011 | Gilbert | |
| 8,027,865 B2 | 9/2011 | Gilbert | |
| 8,032,405 B2 | 10/2011 | Gilbert | |
| 8,051,033 B2 | 11/2011 | Kenedy et al. | |
| 8,051,073 B2 | 11/2011 | Tunkelang et al. | |
| 8,065,184 B2 | 11/2011 | Wright et al. | |
| 8,065,254 B1 | 11/2011 | Das et al. | |
| 8,069,055 B2 | 11/2011 | Keen | |
| 8,078,606 B2 | 12/2011 | Slackman | |
| 8,095,523 B2 | 1/2012 | Brave et al. | |
| 8,099,376 B2 | 1/2012 | Serrano-Morales et al. | |
| 8,126,881 B1 | 2/2012 | Sethi et al. | |
| 8,326,845 B2 | 12/2012 | Sethi et al. | |
| 8,375,037 B2 | 2/2013 | Sethi et al. | |
| 8,600,823 B1 | 12/2013 | Raines et al. | |
| 8,620,717 B1 | 12/2013 | Micaelian et al. | |
| 8,868,572 B2 | 10/2014 | Sethi et al. | |
| 8,954,424 B2 | 2/2015 | Gupta et al. | |
| 9,104,718 B1 | 8/2015 | Levy et al. | |
| 9,324,104 B1 | 4/2016 | Levy et al. | |
| 2003/0004745 A1 | 1/2003 | Takakura | |
| 2003/0088457 A1 | 5/2003 | Keil et al. | |
| 2003/0229552 A1 | 12/2003 | Lebaric et al. | |
| 2005/0027670 A1* | 2/2005 | Petropoulos | G06F 17/30867 |
| 2005/0086070 A1 | 4/2005 | Engelman | |
| 2005/0154717 A1 | 7/2005 | Watson et al. | |
| 2006/0026081 A1 | 2/2006 | Keil et al. | |
| 2006/0041465 A1 | 2/2006 | Woehler | |
| 2006/0248035 A1* | 11/2006 | Gendler | G06F 17/30864 |
| 2007/0143184 A1 | 6/2007 | Szmanda | |
| 2008/0065425 A1 | 3/2008 | Giuffre et al. | |
| 2008/0222010 A1 | 9/2008 | Hudak et al. | |
| 2009/0006118 A1 | 1/2009 | Pollak | |
| 2009/0112927 A1 | 4/2009 | Chitnis et al. | |
| 2011/0055207 A1 | 3/2011 | Schorzman et al. | |
| 2012/0005045 A1 | 1/2012 | Baker | |
| 2013/0030870 A1 | 1/2013 | Swinson et al. | |
| 2013/0179252 A1 | 7/2013 | Dong et al. | |
| 2014/0100989 A1 | 4/2014 | Zhang | |
| 2016/0343058 A1 | 11/2016 | Levy et al. | |

(56) References Cited

U.S. PATENT DOCUMENTS

OTHER PUBLICATIONS

U.S. Appl. No. 13/927,513 including its prosecution history, the cited references, and the Office Actions therein, Not Yet Published, Levy et al.
U.S. Appl. No. 13/938,045 including its prosecution history, the cited references, and the Office Actions therein, Not Yet Published, Franke et al.
U.S. Appl. No. 14/060,434 including its prosecution history, the cited references, and the Office Actions therein, Not Yet Published, Levy et al.
U.S. Appl. No. 14/566,402 including its prosecution history, the cited references, and the Office Actions therein, Not Yet Published, Franke et al.
U.S. Appl. No. 14/795,809 including its prosecution history, the cited references, and the Office Actions therein, Not Yet Published, Levy et al.
U.S. Appl. No. 15/253,007, Including its prosecution history, the cited references, and the Office Actions therein, Not Yet Published, Franke et al.

* cited by examiner

PREDICTIVE CONVERSION SYSTEMS AND METHODS

CROSS-REFERENCE TO RELATED APPLICATIONS

This application is a continuation of U.S. patent application Ser. No. 13/664,268, titled PREDICTIVE CONVERSION SYSTEMS AND METHODS, filed on Oct. 30, 2012, which is a continuation of U.S. patent application Ser. No. 13/357,540, titled PREDICTIVE CONVERSION SYSTEMS AND METHODS, filed on Jan. 24, 2012, which is a divisional of U.S. patent application Ser. No. 12/333,124, titled PREDICTIVE CONVERSION SYSTEMS AND METHODS and filed on Dec. 11, 2008, which claims the benefit under 35 U.S.C. 119(c) of U.S. Provisional Application No. 61/013,198, titled PREDICTIVE CONVERSION SYSTEM AND METHOD and filed on Dec. 12, 2007. Each of the foregoing applications is hereby incorporated by reference herein in its entirety, including specifically but not limited to the systems and methods relating to predictive conversion.

BACKGROUND

Field

The present invention generally relates to search engine technology and, more particularly, to conversion rate predictors.

Description of the Related Art

As the Internet has gained in popularity, it has become an increasingly common means through which to discover, research, buy, sell, and rent items. For example, it is common for individuals, retail merchants, and others to place listings on various websites for cars, real estate, rentals, merchandise, services, and many other categories of listings. Users traditionally may browse through these listings using well known navigation tools. Additionally, some websites allow a user to enter a search term or category to locate particular subjects or items of interest.

Typically, the searching mechanisms rely on an item listing containing a reference to the search term of interest. A deficiency of such a system is that item descriptions may be incomplete or may use a variety of terms to describe a given aspect of the item. Accordingly, the relevance of certain items to a search request may not be properly recognized by traditional systems and methods.

SUMMARY

In one embodiment, a system and method of predicting sale transaction conversion rate of an item operates through a search of information in response to a query over a network. The item can be included in a category of items. Information for other relevant items of the category is available through network query and historical data, among others. Respective information for the other items of the category is available to the method. The system and method includes discovering available information of the item of interest, extracting certain of the available information of the item, analyzing the certain information for the item by comparing the information to other item information for the category of items, weighting the information for the commercial item in comparison to other items of the category, calculating a predictive score for the commercial item of interest, and presenting the information of the commercial item of interest ranked according to the predictive score as compared to other items of the category.

In certain embodiments, a computer-implemented search engine method of ranking a search results list comprises receiving, in a server device, a user search request for an item, wherein the request comprises at least a product category and a search criteria selected by the user. The computer-implemented search engine method can also comprise receiving, in the server device, a content publisher preference, wherein the content publisher preference comprises at least a preference to maximize revenue or a preference to maximize user experience. In certain embodiments, the computer-implemented method can also comprise searching an inventory database for a plurality of items matching the search criteria, wherein a predicted conversion factor has been pre-assigned to each of the plurality of items, wherein the predicted conversion factor is determined based on a logistic regression formula; generating, in the server device, a list of the plurality of items based on the searching; applying, in the server device, to the conversion factor for each of the plurality of items a value to be paid by a supplier of the item, wherein the applying is performed if the content publisher preference is to maximize revenue; prioritizing, in the server device, the list of the plurality of items based on the conversion factor; and outputting from the server device the list of the plurality of items in the order based on the prioritizing.

In certain embodiments, a computer-implemented search engine method for building an inventory database that comprises receiving, in a server device, inventory data for a plurality of products from at least one inventory data source; extracting, in the server device, stated metadata from the inventory data for each product. The computer-implemented method can also comprise determining, in the server device, a product category or a product identification based on the stated metadata. In certain embodiments, the computer-implemented method comprises comparing, in the server device, for each product the product category or the product identification to stored metadata in a metadata database, wherein the metadata database comprises additional metadata for a plurality of products. The method can also comprise identifying, in the server device, derived metadata for each product based on the comparing, wherein the derived metadata is metadata that is not stated metadata and is in the metadata database; generating, in the server device, a specific conversion rate for each product based on inputting the stated metadata and the derived metadata into a conversion rate formula, wherein the conversion rate formula is based on a logistic regression analysis; assigning, in the server device, the specific conversion rate corresponding to each product; and storing in an inventory database for each product the stated metadata, the derived metadata, and the conversion rate.

In certain embodiments, a computer-implemented search engine method for generating and applying a formula for calculating an expected conversion rate that comprises receiving, in a server device, stated metadata and derived metadata elements for a plurality of products that led to prior user conversions. In certain embodiments, the computer-implemented method comprises determining, in a server device, the relevance of each stated metadata and derived metadata elements in deriving expected conversion rates, wherein the determining is based on the use of a logistic regression; generating on a periodic basis, in the server device, a formula based on the determining, wherein the formula takes into account a plurality of stated and derived metadata elements that have been determined to be statistically relevant to expected conversion rates; and applying, in the server device, the formula to a plurality of products in an inventory database to assign a predicted conversion rate for each product in the inventory database.

In one embodiment, the system can generate a conversion rate prediction for an item of potential commercial transaction. The system can be operable over a communications network in conjunction with a database and/or bank of transaction data. In certain embodiments, the system includes a feed processor module in communication with the network, for formatting a discovered information about the item, data extractor module in communication with the feed processor module, for selectively choosing certain of the discovered information about the item, an analyzer module in communication with the data extractor module, for comparing the certain of the discovered information to the transaction data of the bank, an estimator module in communication with the analyzer module, for weighting the discovered information as to the transaction data of the bank, and a prioritizer module for ranking the discovered information according to a result of the estimator module.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects and advantages of the invention are described in detail below with reference to the drawings of various embodiments, which are intended to illustrate and not to limit the invention. The drawings comprise the following figures in which.

DETAILED DESCRIPTION OF THE EMBODIMENTS

Figure 1:
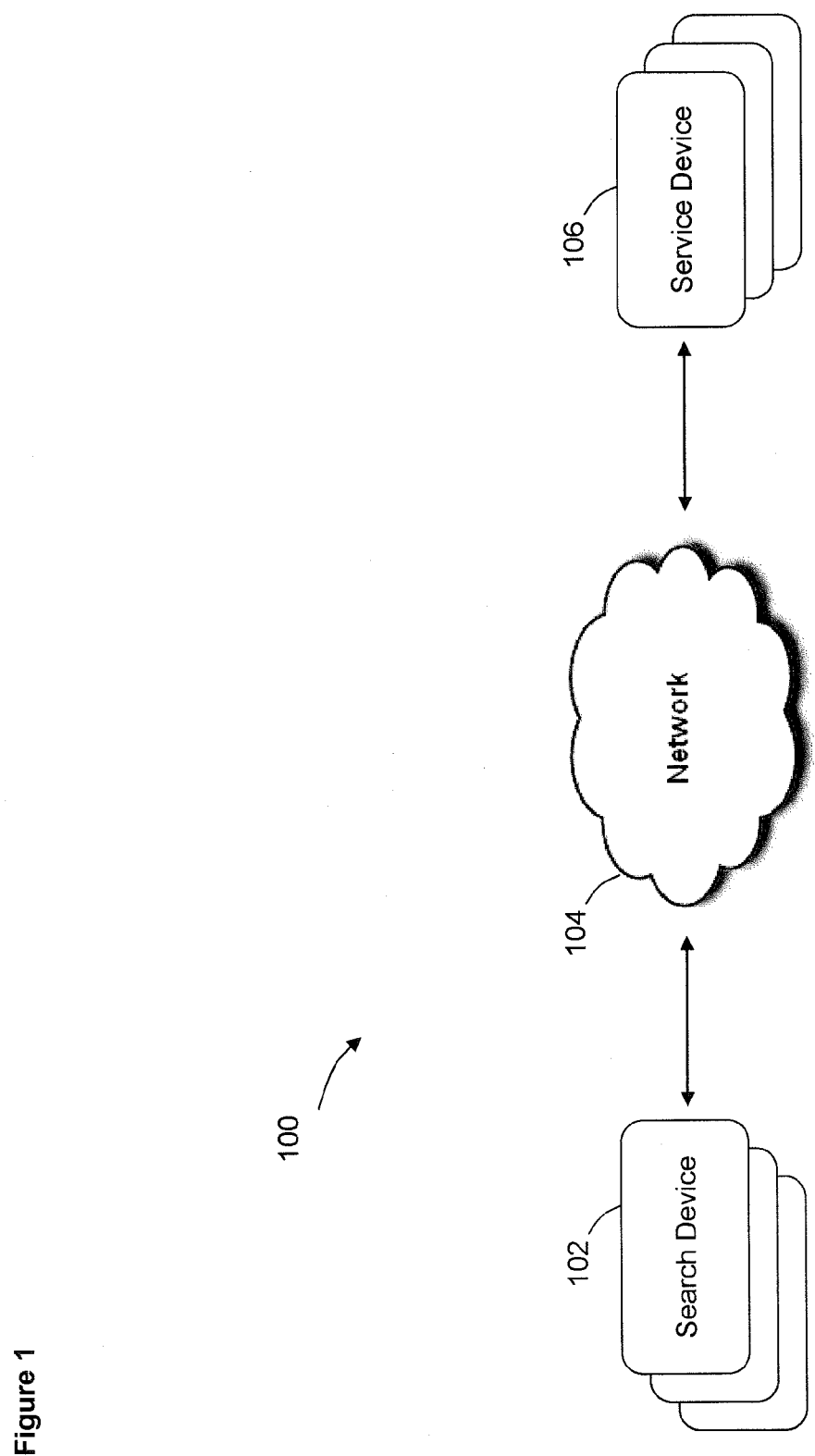
FIG. 1 is one embodiment of a high-level block diagram illustrating a plurality of search devices in communication with a plurality of service devices through a network.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

For example, in response to a user search request for a product and/or item, a conversion estimator module can be configured to conduct a search of a product and/or item database to determine and/or obtain a list of the available products and/or items matching and/or relating to the user search request. For each available products and/or items on the resulting and/or generated list, the conversion estimator module can be configured to obtain from the database corresponding weighting, ranking, and/or rating data. Based on the weighting, ranking, and/or rating data, the conversion estimator module can be configured to sort, filter, rank, and/or reorder the listing available products and/or items based on the weighting, ranking, and/or rating data associated with each product and/or item. For example, the products and/or items having high weightings, rankings, and/or ratings appear at the top of the list. In another example, the products and/or items having the highest weighting, ranking, and/or rating appears fourth on the list of because historical data may indicate that a user (and/or users) generally picks the fourth item on the list. In another example, the weighting, ranking, and/or rating for product and/or item can be multiplied against the advertising revenue, conversion revenue, and/or other revenue generated when a conversion of the product and/or item occurs. Based on the modified weighting, ranking, and/or rating, a ranking and/or recommendation module can be configured to sort, filter, rank, and/or reorder the listing available products and/or items (for example, the products and/or items having high modified weightings, rankings, and/or ratings appear at the top of the list).

As used herein, the terms "product," "goods," "service," "inventory," and "items" are interchangeable, and broadly refer to any category of products (used or new) and/or services, including without limitation automobiles, vacation rentals, real estate, apartments, rentals, jobs, any kind of merchandise, tickets, pets, horses, services, or the like. Examples of services include but are not limited to childcare, pet-care, elder-care, maid services, accounting, legal, programming, or the like.

Further, the terms "metadata," "metadata elements," and "meta data" broadly refer to without limitation any information that describes, relates, is associated with, or is database-linked to a product, a plurality of products, or data that relates to a product. For example, metadata for a car product may include but is not limited to the color, make, model, manufacture data, accessories, CARFAX® report, Consumer Report® data, Kelley Blue Book® report, or the like. Metadata can be further divided into two subcategories: (i) stated metadata, and (ii) derived or implied metadata.

"Stated metadata" broadly refers to metadata that can be extracted or obtained from an original product description without referring to an alternative source. For example, if a car advertisement provides the make, model, and year information, then the stated metadata is the make, model, and year information.

In contrast, "derived or implied metadata" broadly refers to metadata that can be derived from an alternative source or can be implied from the product or product description even though such derived metadata is not stated in the product description. For example, if a particular make, model, and year of a car invariably comes with a sunroof, then the fact that the car has a sunroof is derived metadata if such information is not stated in the product description. Other examples of derived metadata and/or sources for derived metadata include without limitation CARFAX® reports, Consumer Report® data, or Kelley Blue Book® reports, housing reports, job reports, location reports, quality reports, blog reports, industry reports, product reports, user reports, news reports, data derived from the Internet, provided that such data is not stated in an original product description, and/or are to be derived from a third party source.

As used herein, the term "conversion" broadly refers to a click-through, a lead generation, a sale, a membership, a referral, a telephone contact, an email notification, or other user action. For example, if a user is presented with a list of products available for purchase, and the user clicks on one of the options, then the user click-through is broadly referred to as a conversion, and more particularly, a click-through conversion. Another example of a conversion is when the user contacts the seller based on a telephone number associated with a particular product in a listing provided to the user.

The term "logistic regression" as used herein broadly refers to a model used for predicting the probability of an occurrence of an event, such as a conversion. A logistic regression model makes use of several predictor variables that may be either numerical in nature or based on categories. For example, the probability that a person clicks on a particular product advertisement provided within a list of available products might be predicted from knowledge of the product metadata, both stated and derived, and/or an analysis of historical user behavior. Other names for logistic regression comprise logistic model, logit model, and maximum-entropy classifier. One example of a logistic regression equation is:

$$\text{logit}(p_i) = \ln\left(\frac{p_i}{1-p_i}\right) = \beta_0 + \beta_1 x_{1,i} + \cdots + \beta_k x_{k,i}.$$

Packetized data communications networks allow information available at respective disparate data communications devices to be discovered and viewed remotely by other network-connected communications devices. Digital data representative of such information can be maintained by network-connected server computers, in conjunction with database software and hardware applications. The information discoverable in this arrangement can be widely varied, and often includes information about items being offered or otherwise promoted for sale, rental, lease, or other commercial transaction. The information can include details about price, availability, location, size, make, model, color, features, and numerous other varied characteristics of offered items.

At least certain characteristics of items offered or otherwise promoted through available information, such as that found on-line over wide-area networks, can have statistical relevance to likelihood or predictability of a click-through, a lead generation, and/or a sale. For example, similar makes or models of items tend to be desirable and can have significant predictability based on such factors as well as others. The automobile (including without limitation other modes of transportation) category can have characteristics of the types that will allow assessment to gain expectations about transaction success. Other items, as well, such as rentals, vacation rentals, collectibles, homes, travel, jobs, merchandise, tickets, pets, horses, services, and many others, can have characteristics of types/categories which allow generalized classification and comparison, and related prediction of sale chances in view of these characteristics. Typically, these types of items can have unique classes of characteristics (such as, for example, the make, model, any characteristics previously mentioned, or the like), and are relatively comparable according to the classes.

Computerized search engines allow searching of disparate communicatively connected information sources over networks and the like. These search engines have generally, upon input of query, searched to discover information based on either keyword or natural language query. Relevant data about a group of items under search can be collected by the search engine, and used in performing the search in order to narrow or index available information. Search results can then access and display (or otherwise made available) in some logical order. The logical order can be a ranked presentation according to relevancy, for example, price, year, model, or the like, in the case of search of for sale items. Other rankings can also be used by search engines in certain instances. Certain search engines charge advertisers for rank location, for example, or more prominently portray information of select or sponsored advertisers/sellers and the like.

Available search information about any subject may be quite extensive and can be available from quite diverse sources. Relevance of search results to keywords and subjects may not accurately reflect desires and needs of the searcher, and particularly, this can be the case in search for items for sale or commercial transaction. Keywords and phrases may not correspond well with the particular metadata collected by search engines for indexing of information. Moreover, targeted advertising and marketing has not generally been afforded by current technologies because search rankings are merely by particular data (for example, price, model, or the like) based on searcher sort order or by preferred advertisers of the search engine company. Predictive assessment (such as prediction of price, conversion, market timing), and buyer motivation and individuality (such as buyer's individual, unique preferences and triggers), have not been factored.

In some embodiments, the search results optimizer system described herein can be configured to build an inventory database based on raw product inventory data that can be received from suppliers and/or advertisers. In receiving the raw product inventory data, the search results optimizer system can be further configured to extract the associated metadata, stated and/or implied, that is related to the products, and the products and the associated metadata are stored in the inventory database. The search results optimizer system can be further configured to generate or calculate a conversion rate for each product in the inventory databases by inputting the associated metadata, stated and/or implied, for each product in a generated logistic regression formula.

In other embodiments, the search results optimizer system is configured to generate a logistic regression formula for a particular product category, wherein the logistic regression formula outputs a probability or a percentage likelihood that a conversion will occur, and wherein the inputs into the regression formula comprise various metadata elements, stated and/or implied, that are statistically correlated to the expected conversion rate. In certain embodiments, the generation of the logistic regression formula is based on an analysis of historical conversion rates for products associated with specific metadata elements, stated and/or implied. The search results optimizer system can also be configured to cancel out, remove, add, diminish, and/or emphasize metadata elements, stated and/or implied, as factors in the generated logistic regression formula, and in some embodiments such changes are based on whether such metadata elements are more or less statistically correlated to expected conversion rates. The generated logistic regression formula can be dynamically updated and/or generated on a real-time and/or periodic basis. The generated logistic regression formula can be computer-generated or generated by entirely or partially with human intervention.

Figure 4:
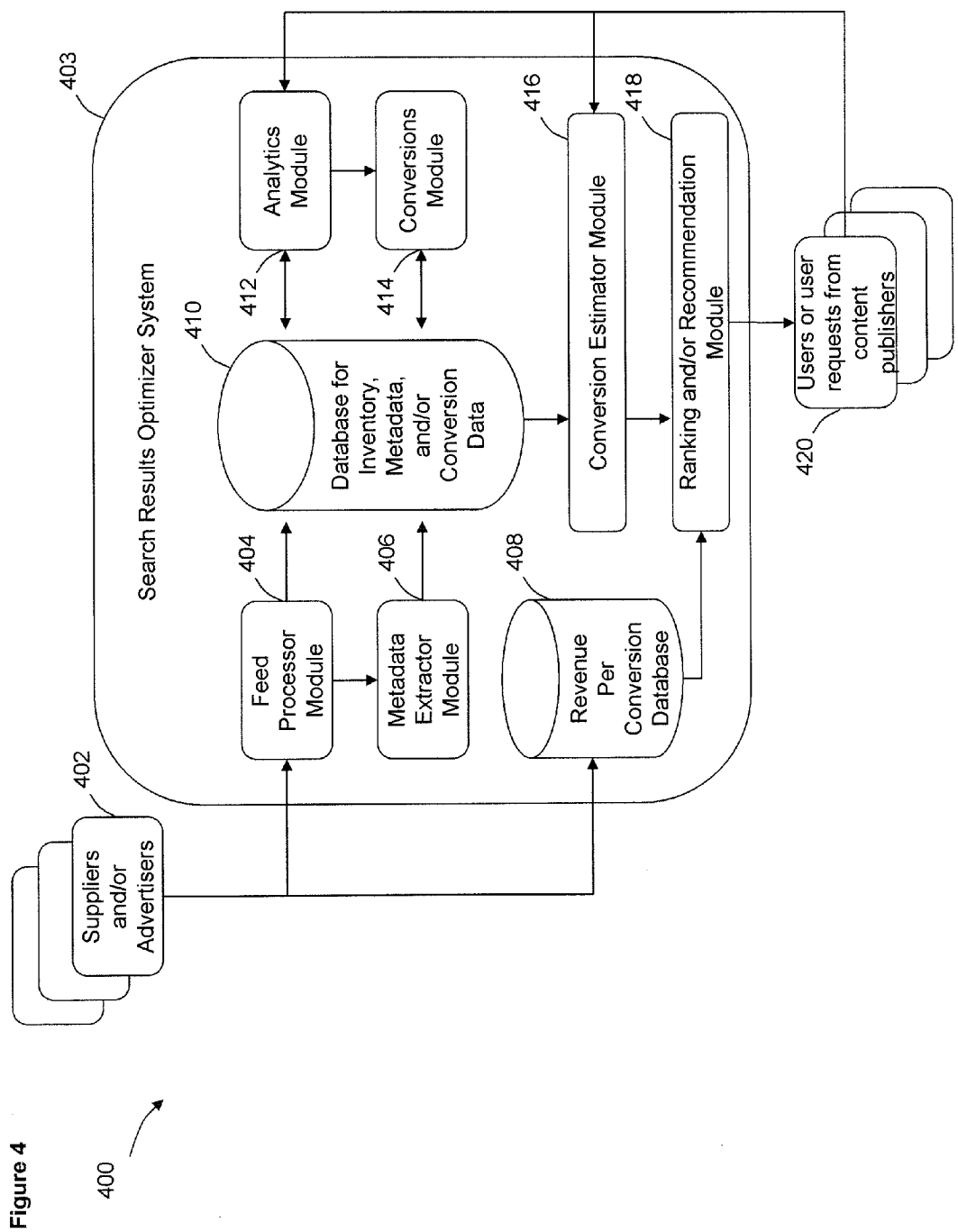
FIG. 4 depicts an example of one embodiment of a search results optimizer system in communications with a plurality of supplier and/or advertiser systems, and a plurality of users.

With reference to FIG. 4, the search results optimizer system 403 can also be configured to receive and respond to user requests (received directly from users, and/or through a content publisher or other third parties) at block 420 for a listing of available products, wherein the user request comprises one or more search terms and a product category. The search results optimizer system 403 can be configured to perform a search of the inventory database 410 based on the one or more search terms and the product category. In certain embodiments, the search results optimizer system 403 is configured to rank the results from the search of the inventory database 410, wherein the ranking can be based on the conversion rate associated with each product in the results list. For example, products with a higher conversion rate are positioned at the top of the search results list. The search results optimizer system 403 can be configured to return the ranked search results list to the user (or content publisher or other third parties) at block 420.

With reference to FIG. 4, in certain embodiments, before returning the ranked list to the user, the search results optimizer system 403 is configured to determine whether the ranked list should be sorted based on user experience or should be sorted to maximize revenue, wherein the determination can be based on the preference of the content publisher or other third party that initially received the user request. If the sort order is based on user experience, then ranked list is ordered based on the conversion rate. If the sort order is based on revenue maximization, the search results optimizer system 403 is configured to generate a new conversion rate by multiplying the old conversion rate for each product by the revenue paid by the supplier or advertiser (wherein the revenue data can be stored in the revenue per conversion database 408) for generating a conversion for the particular product. The search results optimizer system 403 can be configured to order the results list based on the new conversion rates for each product, and return the ranked list to the user (or content publisher or other third parties) at block 420. In some embodiments, the search results optimizer system 403 can be configured to receive or obtain revenue paid or cost per conversion information or data from suppliers and/or advertisers at block 402, and store the foregoing information or data in the revenue per conversion database 408.

In reference to FIG. 1, a system 100 for predicting likelihood of sales-lead conversion as to an item or product offered for commercial transaction includes a communicative search device 102 in communication with a network 104. At least one communicative information source/service device 106 can also be in communication with the network 104. The search device 102 is able to communicate with the information source/service device 106 in order to access information over the network 104 available at the information source/service device 106.

The network 104 can be any communicative connection or link between the search device 102 and the information source/service device 106. For example, the network 104 can be a wide-area packetized network, such as the Internet, an enterprise search engine, such as an intranet, personal search engine or mobile search engine, or other link or channel. The search device 102 and the information source/service device 106 can be any computer or processing device or feature suitable for performing the operations here described therefor. For instance, the search device 102 can be a client computer, such as desktop, laptop, PDA, data-enabled phone or the like, and can be fixed or mobile and connected to or in communication with the network by wire, wireless, or otherwise. The information source/service device 106 is, for example, a server computer electronically coupled and/or connected and/or in communication with the network 104, communicatively connected by wire or other link for communication with network devices. The information source/service device 106 includes, or has access to, an information store, such as a hardware or software database, containing information accessible over the network 104 from the source/service device 106. The search device 102 includes communicative hardware and/or software, and related applications for search and access to information from the information source/service device 106 over the network 104. The source/service device 106, together with associated database and infrastructure required for searchability, is herein sometimes referred to collectively as "search engine".

In operation, the search device 102 queries the source/service device 106 over the network 104 of the system 100, per a search request for information of the source/service device 106. In response to the query, the source/service device 106 makes accessible to the search device 102 a result. The result typically comprises a plurality of sets of information corresponding to the query. The result can be ranked for the search device 102 by motivational and/or conversional rate factors to the user of the search device 102. In particular in the case of items offered for sale, such as used cars, the result can be ranked for the search device 102 according to predicted price and predicted lead conversion rate (for example, predicted rate of sale per leads and expected time on market until sale, or the like). The subjects/categories for predictive assessment can be varied according to desired implementation, application, sale item, and other factors, with ranking sort dictated by applicable assessment. This yields more focused and targeted results for each individual searching user, according to purchase motivations, conversion rates, and tendencies of the individual.

With the system 100, an operator of the search engine can be able to dictate source of its revenue generation for the search engine use and availability through the system 100. Network advertising can be categorized as either cost per listing (CPM), cost per action (CPA), or cost per click (CPC), or the like. The search engine of the system 100, however, allows the operator to vary the revenue generation scheme for the operator as to each respective dealer, item, class, category, and so forth. The operator is, thus, able to balance interests of advertisers, such as to make a speedy sale versus highest price, with those of customers, such as customer individual and targeted interests and motivations. These and other aspects are later elaborated.

Figure 2:
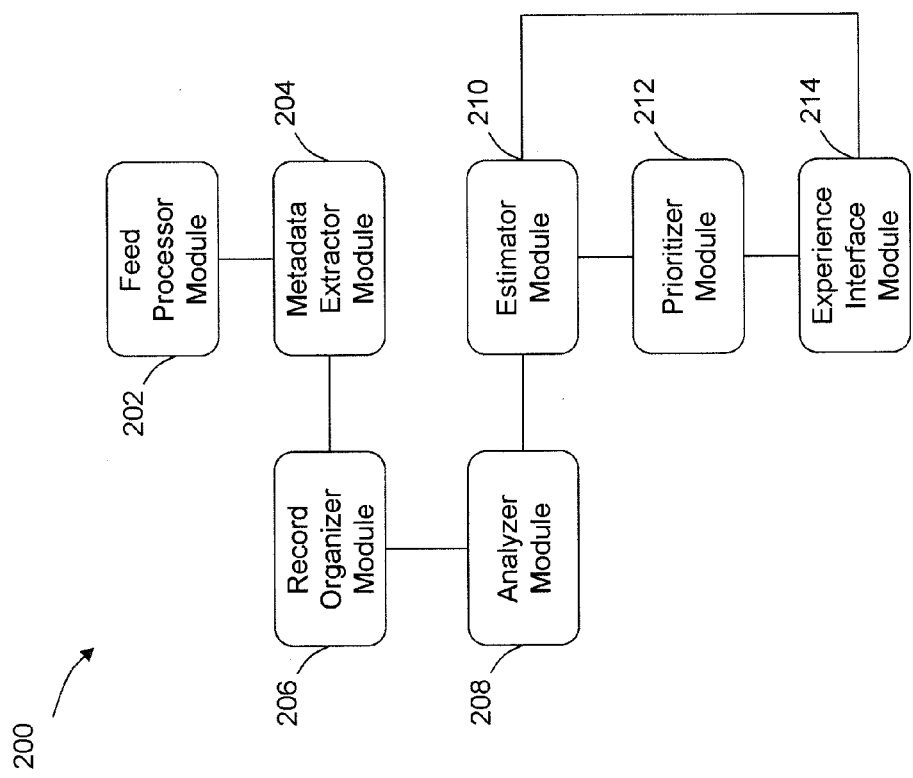
FIG. 2 depicts an example of one embodiment of a high-level block diagram illustrating a search results optimizer system comprising various modules.

With reference to FIG. 2, a predictive system 200, such as the system 100 of FIG. 1, includes a feed processor module 202. The feed processor module 202 discerns information available to the system 200 responsive to search inquiries over a network (not shown in detail in FIG. 2, but shown in FIG. 1). The feed processor module 202 accesses information from available sources, and then converts the feeds into a useable format for information for the system 200. For purposes herein, the term "Vcells" can be used to identify such information formatted for the system 200 as to each particular product, item, record and/or set of information. If the product and/or item of information regards a car or other product for sale, for example, the Vcell can be a set of data accessed by the system 200, to be formatted to a Vcell format to yield particular relevant pieces of the information for the system 200. Information accessed by the system 200 can be suitably formatted as accessed or may otherwise require formatting as appropriate for the system 200. The feed processor module 202 discerns the information in each event, to make the information available in searching with the system 200.

The feed processor module 202 can be in communication with a metadata extractor module 204. The metadata extractor module 204 ascertains particular types of information contained in each Vcell from the feed processor module 202. In particular, information of price, make, model, mileage and the like for cars can be obtained for each Vcell (for example, item record of the feed processor module 202). The particular subjects of the metadata information obtained via the metadata extractor module 204 are variable and varied, depending on the desired application and configuration. For cars and other sales items, the metadata information can include information relevant to prediction of price, rate of conversion, and also details of features of each individual sale item.

The metadata, itself, can be comprised as a record by a record organizer module 206. The record organizer module 206 can be in communication with the metadata extractor module 204. The record organizer module 206 associates as a record for each sale item or product, the metadata for the item or product, including, in the case of Internet sale items or products, the Uniform Resource Locator (URL) for a webpage on which the item is offered and specific item product information (for example, price, make, model, or the like). This metadata so organized by the record organizer module 206 is the "record" of an item, for use by the system 200 in search and predictive operations.

The record organizer module 206 can be in communication with an analyzer module 208. The analyzer module 208 can compare item specific information for each item to aggregate comparative information from other available information for pluralities of items of the type, class, category and/or features of the item. In effect, the analyzer module 208 can compare other available information, including from historical, then-accessed estimated, and other sources, and associates item specific information to comparables.

The analyzer module 208 can be in communication with an estimator module 210. The estimator module 210 can include without limitation logical circuits and processor, implemented in hardware and/or software. Logical determinations can be made by the estimator module 210 based on system 200 parameters, such as set by the system 200 operator and available from the extractor module 204 and the analyzer module 208. Numerous and wide varieties of logical determinations can be made by the estimator module 210 operations. The estimator module 210 receives each record applicable to a search query, and then assesses estimated or predicted aspects regarding sale or other transaction involving transaction for the item of the record. Feedback of the system 200 can be provided to the estimator module 210, such as user experience inputs, sale events, and the like, and the estimator module 210 also uses the feedback in assessment and prediction. With cars and Internet sale offerings, as an example, the estimator module 210 can be employable to ascertain likelihood or chance that a user searcher will take next action, such as input, further request, purchase, or the like. Further details are explained in the examples below.

A prioritizer module 212 can be in communication with the estimator module 210. The prioritizer module 212 can rank each respective item information record, as to other item information then accessed and otherwise available to the system 200. For example, a ranked listing can be generated by the prioritizer module 212. The ranked listing from the prioritizer module 212 can be made accessible to the searching user, for view, display, and use in making transaction choices (for example, purchase decisions). The rank of the list via the prioritizer module 212 is according to desired attributes, including estimated or predicted considerations as determined by the estimator module 210. Price estimation and sale conversion rate estimation are two primary examples of attributes for ranking for each independent item and corresponding record.

An experience interface module 214 allows input by the searching user as to various aspects of the use of the system 200. The interface module 214 can be in communication with the estimator module 210. Inputs by user searchers are feedback to refine, tune and update predictive capabilities, as well as system 200 features and usability. These inputs allow assessment of system 200 features that are most desirable, estimations or predictions that are most favored by users, and purchase and action decisions of users. The interface module 214 can input as feedback are also employable to vary system 200 parameters and logic, including estimator module 210 operations and results.

Figure 3:
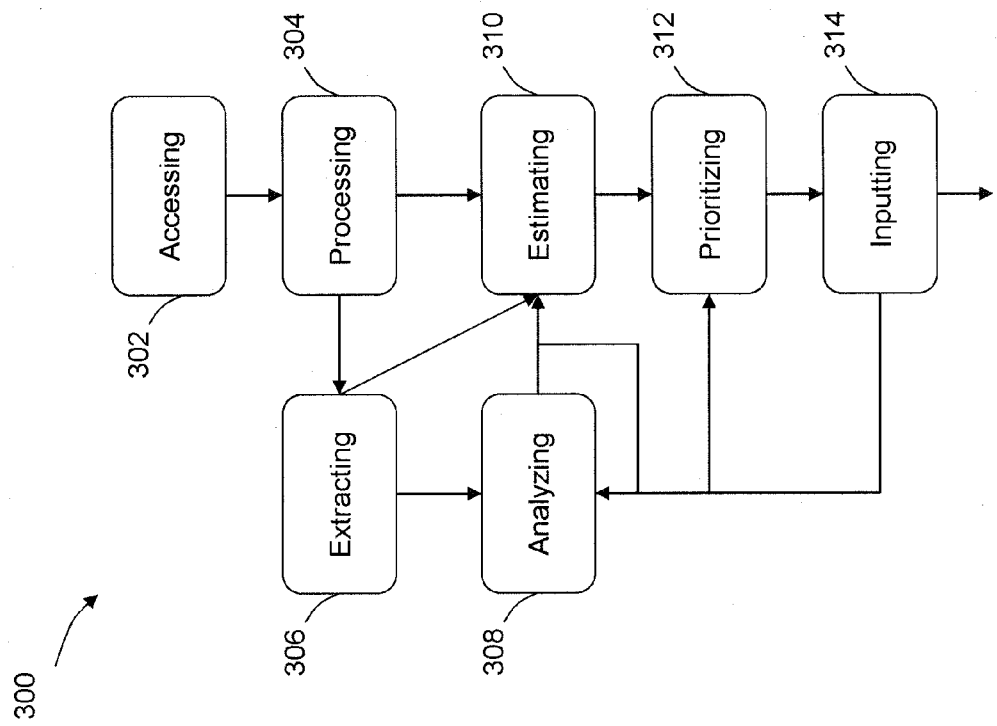
FIG. 3 is one embodiment of a high-level block diagram illustrating processes that can be performed in a search results optimizer system.

Referring to FIG. 3, a method 300 (which can be implemented without limitation in a specialized and/or general computer and/or system) of predicting transaction aspects includes block 302 of accessing a pool of transaction information. The block 302 ascertains available information regarding transaction items and details. The block 302 is performable, for example, through communications over a network by a search device to source/service devices for such information. In particular implementations, the predictive system 100 of FIG. 1 and the system 200 of FIG. 2 perform the block 302 by search query on the Internet or through other network. Generally, a large pool of transaction information can be available from disparate sources. Search queries somewhat narrow the information of the pool. However, wide variety of information subsets of the pool can be accessed. The method 300 focuses and targets the information to specific search user and transaction, and allows pertinent ranking for transaction decision-making including through predictive assessments.

Subsets of information accessed in block 302 are processed in block 304. In the processing block 304, the subsets are converted into useable format (as previously referred to, the "Vcells") for the method 300. Subsets to the processing block 304 can have widely varied formatting, substance and context in any instance. The subsets can be available for the block 304 in generally suitable format or may otherwise require significant conversion to suitable format. The processing block 304 translates/converts the varied data to respective Vcells as to each information per item. These Vcells are then capable of analysis in the method 300.

After the processing block 304, specific data from each Vcell (for example, the specific data is item-specific for each item for transaction) can be extracted in block 306. The block 306 obtains metadata relevant to the search user query and the particularities of the user, the method 300, and the circumstances of the transaction. In the instance of a query for purchase transaction involving a used car, the metadata from block 306 can include such matters as price, make, model, mileage and other features and details for each car of each item of Vcell. This metadata can be organized by the extracting at block 306 according to item identity, as well as source of information (for example, such as URL), and item information/details relevant for the particular instance.

Analyzing at block 308 can be performed in the method 300 with the extracted data from the extracting block 306. The block 308 compares item-specific data for each item of the extraction (for example, such as each for sale item) to comparable data. The comparable data for the method 300 can be available from other blocks of the method 300, as well as the analyzing block 308, feedback, historical comparators, and other particulars.

Estimating at block 310 can be performed based on results of the block 308 of analyzing. In the estimating block 310, logical determinations are made as to predictive values and specifics. The logical determinations are made by comparison and weighting of data relevant to the matters for prediction. Optimization of estimation at block 310 can be variable, and can include data of greatest revenue to method 300 operator, best customer experience or value, or others. Certain set parameters at block 310, for example, historical expectations, hierarchy of interest, and the like, are employable by the method 300 at block 310. Additionally, canvas and comparison of subsets of information, other sources of information, historicity, and weighting are implemented for determinations in block 308.

Prioritizing block 312 ranks items queried and discerned by method 300. The block 312 can be operable according to predictive assessments from the method 300, as well as user input and variables dictated by the operator and implementation. The prioritizing block 312 allows search user access to lists, by rank, according to rules of in block 312. Predictive or estimated values and assessments, such as price estimation and sale conversion rates, are important to the rank generated by the block 312.

In an inputting block 314, a search user who accesses ranked transaction listings from the method 300 inputs to the method 300 information that can then be useable by the method 300 in present and later operations. For example, actions of input by the search user, inaction, next clicks, further reviews, sale consummations, and others are registered by the method 300 in the inputting block 314. The information from the block 314 affects operations of the method 300, including the estimating block 310 and prioritizing block 312. Additionally, the step 314 provides to the method 300 insight to user activities, preferences, and information helpful to the provider of the method 300 in tailoring and better delivering the method 300 to search users.

The foregoing systems, methods, embodiments and aspects are further understood in particular example implementations and configurations.

Example/Embodiment

A used car sale search can be performable by a user searcher over the Internet. An operator/provider can make accessible to the user searcher over the Internet, targeted and focused select information and ranking of the information. In particular, the operator/provider can maintain a web server and associated database. Information of car items for sale can be available to the web server, including via the database. The web server can include search query application for user searcher input in order to obtain relevant results.

In operation, the user searcher (for example, customer) can input a query to a web site accessible from the web server. The web server can obtain available car sale item information, discerns relevant information from the entire pool of such information, and converts the relevant information to individuals Vcells for each item for sale. Certain information can be available for Vcell formatting in readily suitable format, whereas other information can require more extensive parsing, sorting and operation. In any event, a Vcell can be generated by the web server and database infrastructure for use in predictive assessment prior to rank and availability to the customer. From the relevant Vcells, metadata can be extracted and analyzed by the web server and database.

As to used car sales transactions, at least two predictive measures may be important in sales. The predictive measures can include without limitation price prediction and sales conversion rate prediction. Price prediction relates to a favorable price according to the particular customer. Sales conversion rate prediction relates to likelihood of sale and period on market prior to sale for the particular car item of interest to the customer. As can be understood, both price and sales conversion rate have various factors that will affect prediction and actual realization. Each measure has relevance to car item characteristics, types and features, as well as uniqueness of the particular customer and other potential and past customers. These and other factors, although not absolute, can be helpful to prioritization of opportunities, furtherance of transaction consummation, and timing of result.

In the example embodiment, the metadata extracted by the web server and database, based on the customer search query and details, can be analyzed by the web server and database with respect to comparative data. The comparative data can include without limitation other relevant search discoveries, for example, historical information, user preferences, operator/provider desired implementations and others. Weighting of the analysis details, and comparison of the details for each searched product or item, provides insight into aspects that can be important to the predictive measures. For example, used car sales prediction can be derived based on sale conversion rates of similar historical sales data and also corresponding price and features for items.

From such weighting, estimates are made for each sale item via the web server and database. These estimates are then employed in ranking and prioritizing for presentation to the customer. This can maximize the customer interests in obtaining targeted and focused options.

The ranking and prioritizing for customers can alternatively or additionally be derived by revenue interests of the operator/provider. In order to maximize revenue generation for the operator/provider, select revenue values are attributable to certain sale items versus other items. Other variations of revenue models can be implemented, as well. If operator/provider revenue is important, then ranking and prioritizing may include assessments based on market time prior to sale completion in each instance, pricing and favorability for sale close, features of respective items and impact to sale consummation, and similar matters. These variations are possible through varied weighting of predictive measures and other specifics of items presented to customers.

Generally, ranking and prioritization for revenue generation versus customer experience can be accomplished through implementations of the following:

Where, r=revenue weighting (with r=1=maximize revenue, and with r=0=maximize consumer experience)

$$ranking\_score = (r * (predicted\_conversion * conversion\_revenue)) + ((1-r) * predicted\_conversion)$$

The "ranking_score" in the foregoing is a derived prioritization factor that can be employed. Of course, other determinations for ranking may be appropriate depending on desires for the situation, arrangement, customers, operator/provider and expectations.

When a user or customer (both can be interchangeable terms as used herein) searches and accesses sale information in these manners, the user's or customer's actions (and inaction) as to presented items and information serves as feedback for refinement of the operations. The feedback can include such interests as similarities of users or customers and items, historical data gathering, user preferences, and a number of other details relevant to present and subsequent customers. The feedback can also be useful to refine website and database operations, customer presentation, and other operations of the operator/provider.

Other models and variations are possible in the used car sale applications. The operator/provider may choose to make "recommendations" to the purchasing customer, ad placement or special display may be a source of added advertising revenues, selected features or models can be separately or uniquely presented, and similar choices. Further, the embodiments are suitable for operation in conjunction with and as adjunct to other presently employed on-line marketing and sales tools and practices, for example, targeted advertising, further offerings of relevance or tendency, and other practices on-line.

Example/Embodiment

Another example application of the foregoing is for offerings of vacation rentals. Similar embodiments of on-line searching and customer presentation are possible with these offerings. Vacation rentals differ (from used cars, for example) in quantification of predictive measures, however, and have greater specificity to location, property distinct circumstances, unique qualities, and availability for particular dates, among other things. Availability, in particular, tends to have high relation to customer choice in certain embodiments.

Although vacation rental offerings can differ as to measure predictions, the differences are primarily accountable through relevancy of data, weighting of factors for each item, and customer expectations. Customer experience (for example, basically similar to customer expectations) can be of greater value for prediction of sale conversion rates and price. Availability for rental can be a quite significant value for the predictions.

As with the other embodiments and the used car example, pools of information regarding rentals are discerned. Information can be formatted as Vcells, and relevant metadata can be extracted. Weighted determinations are made, and prioritization and ranking presents focused and targeted information to the customer. Weighting determinations can differ from other examples, for example, availability can be significant. Also, location (for example, ocean view, beach access) and amenities (for example, tennis, golf) can be critical. Price can be important to the consumer, but may not be so important to conversion estimation rates in at least some instances.

Other Embodiments

The embodiments utilize information, then-accessible and also historical, to prioritize and rank. Revenue generation desires of the operator/provider can have different considerations, however, these are accountable through estimations in similar manners. Numerous other varied, similar and different examples are possible. Many users can benefit from prediction of customer experience and conversion rates, when implemented in desirable manner in accordance with the foregoing examples.

In the foregoing examples, data mining and similar information discovery practices are utilized to discover information for customer results. Statistical qualification and quantification are employed to discern, segregate and weight for prioritization and ranking, according to predictive measures and others. The embodiments can prepare data in accordance with statistical principals. In particular, the embodiments account for missing data as to items or subsets. The missing data can be addressable by discarding particular data that is not contained in any item or subset of information. In discarding particular data, linear regression or classification models can be employed. Specific data, such as price data, or other specific data about items can be discarded without effect to other data discovered about an item or subset. Also, as may be appropriate in certain instances, entire item or subset information can be discarded if missing and would skew or adversely affect statistical analysis. Other options include defaulting of data where the particular data is not necessarily critical to predictive estimations made through the embodiments. Zip code information, for example, may not be critical in some instances, and rather than performing regression or other analysis as to the particular information, the data can default to value not considered for other purposes of the embodiments.

Other particular data discovered as to items or subsets can be inconsistent or out of relevant bounds when viewed with respect to other such data for other items or subsets. Examples include instances of discovered data that can be alternately encoded by available sources of the information. A four wheel drive vehicle might be encoded as "4WD", "4×4" or other. Logic of the embodiments either recognize these as equivalent and accordingly compensate, or otherwise handle non-recognizable inconsistencies.

Estimated or prescribed values can be employed in replacement of certain specific erroneous or "out of bounds" data in certain instances. A misrepresented value, for example, extra numbers or letters in information, could affect predictions and other measures by the embodiments if considered for assessments. Thus, statistical methods can be employable in the embodiments to account for and avoid concerns from such data.

Although other statistical procedures can be employed in the embodiments, linear regression analysis of fields of interest of specific data can be suitable. In the linear regression analysis, the specific data relevant to and employed in predictive evaluation can be assessed. Account is taken to address any data that is not desirable and/or would yield inaccuracies.

Once regressions are performed with specific data of relevant fields for the predictive measures, these data are refined and quantitized. Rankings are performed by weighting according to sale items, products, and/or offerings. Historical, as well as currently available, data and feedback data are used in the analysis, as deemed appropriate by the operator/provider maintaining the web server and database. Weightings in accordance with the foregoing embodiments use all or some of the factors of significance to predict measures of price and sales conversion rates. Relative weightings are as implemented by the operator/provider for desired interests, including without limitation operator/provider revenue generation and customer experience.

Search Results Optimizer System

FIG. 4 depicts an example of one embodiment of a search results optimizer system 403 in communications through a network with a plurality of supplier and/or advertisers and/or corresponding systems 402, and a plurality of users or corresponding user systems 420. In certain embodiments, the search results optimizer system 403 can be an embodiment of the source/service device 106 of FIG. 1, whereas the users or corresponding user system 420 can be an embodiment of the search devices 102 of FIG. 1. In certain embodiments, the supplier and/or advertisers and/or corresponding system 402 provides, transfers, transmits, and/or routes advertising and/or supplier data on a real-time, substantially real-time, periodic, batch, and/or delayed basis to the search results optimizer system 403. In certain embodiments, the users and/or corresponding user system 420 provides, transfers, transmits, routes and/or routes (directly or indirectly through a third party search engines, content publishers, or other entities) search requests or search criteria to the search results optimizer system 403.

With reference to FIG. 4, in certain embodiments, search results optimizer system 403 can comprise a feed processor module 404, metadata extractor module 406, a revenue per conversion database 408, a database for inventory, metadata, and/or conversion data 410, a conversion estimator module 416, a ranking and/or recommendation module 418, an analytics module 412, and a conversions module 414. In certain embodiments, the database 408 and/or the database 410 can be a single database storing multiple tables, and/or each can comprise a plurality of databases.

In reference to FIG. 4, the feed processor module 404 can be configured to receive product inventory data (raw, formatted, processed, and/or otherwise) from one or more suppliers and/or advertisers, and/or corresponding systems 402. The feed processor module 404 can be configured to convert the product inventory data into a useable and/or compatible format for further processing by search results optimizer system 403. In certain embodiments, the search results optimizer system 403 can be configured to process, format, and/or convert the product inventory data into a Vcell format or configuration (for example, as discussed herein with reference to FIG. 2). The feed processor module 404 can also be configured to store and/or save, with or without processing or formatting, the product inventory data into the database for inventory, metadata, and/or conversion data database 410.

As illustrated in FIG. 4, the feed processor module 404 can be coupled or be in communication with a metadata extractor module 406. The metadata extractor module 406 can be configured to extract, ascertain, interpret, determine, retrieve, analyze, identify, locate information contained in the product inventory data and/or Vcell from the feed processor module 404 (for example, as discussed in reference to FIG. 2). In certain embodiments, the metadata extractor module 406 can be configured to use the product inventory data to generate, obtain, extrapolate, and/or supplement with derived/implied metadata (for example, as discussed in connection with FIG. 5).

With reference to FIG. 4, the revenue per conversion database 408 can be configured to receive and/or store data from suppliers and/or advertisers and/or corresponding systems 402. In certain embodiments, the data received from suppliers and/or advertisers can include without limitation the revenue generated from and/or amount paid by the suppliers and/or advertisers for generating a conversion for the product, and/or the cost per conversion. The data received from suppliers and/or advertisers can also include without limitation supplier/advertiser a plurality of advertisement/supplier data (for example, graphics, video, audio, text, or the like), miscellaneous information (for example, product availability, location, features, discounts, or the like); preference data (for example, which advertisement is preferred by the advertiser/supplier), or the like.

In reference to FIG. 4, the analytics module 412 can be configured to receive, analyze, process, interpret, and/or reformat user search requests (either directly from the user or through a third party content publishers or other third parties) 420. The requests may include without limitation a search for and/or a listing of available products, wherein the user request comprises one or more search terms, a product category, a make, a model, a price or price range, a year, and/or other characteristic. The analytics module 403 may use, filter, combine, analyze, interpret the user request data with the data from the database 410 for inventory, metadata, and/or conversion data to determine, generation, and/or analyze historical user behavior associated with related user searches. The analytics module may additionally send user request information to a conversions module 414 that can be additionally in communication with the database 410.

With reference to FIG. 4, in certain embodiments, the conversions module 414 can be configured to receive conversion data from users and/or corresponding user systems 420. Conversion data can include without limitation whether the user clicked on a product, or generated a lead for the advertiser/supplier, produced a sale, or the like. The conversions module 414 can be configured to analyze and/or filter the original user request in conjunction with the conversion data, and other historical data and/or parameters from the user or other users (obtained from database 410), to identify, determine, extrapolate, and/or calculate (for example, using a logistic regression analysis as described herein) the characteristics of the user request and/or the characteristics of the product that correlate, predict, and/or indicate whether a conversion would likely occur. The conversions module 414 can be configured to use the foregoing analysis to generate and/or adjust product characteristic weighting factors stored in the database 410.

For example, if the conversions module 414 reviews, analyzes, and/or processes a user request for a car in conjunction with the conversion data derived from the user's actions, and the historical data of other users performing a similar search request, and determines, filters, and/or calculates that red cars leads to a greater number of conversions, then the conversions module 414 can be configured to increase the weighting factor for the car characteristic "red cars" that is stored in database 410. In another example, if the conversion module 414 reviews, analyzes, and/or processes a user request for programming jobs in conjunction with the conversion data derived from the user's actions, and the historical data and/or parameters of other users performing a similar search request, and determines, filters, and/or calculates that the term "executive" in the job title leads to a greater number of conversions, then the conversions module 414 can be configured to increase the weighting factor for the job characteristic "executive" that is stored in database 410.

In reference to FIG. 4, the conversions estimator module 416 can be configured to receive user search request 420. In response to user search requests 420, the conversion estimator module 416 can be configured to perform, conduct, and/or search the database 410 for available products and/or inventory that matches and/or relates to the user search request. The conversion estimator module 416 can also be configured to obtain, locate, and/or retrieve weighting, ranking and/or rating data corresponding to the products and/or inventory that matches and/or relates to the user search request. In certain embodiments, weighting, ranking and/or rating data correlates and/or relates to the predicted conversion rate of the product and/or inventory. For example, the higher the weighting, ranking and/or rating data, the more likely a conversion will occur for the product or inventory. In certain embodiments, the conversion estimator module 416 can be configured to sort, filter, rank, and/or reorder the listing of the products and/or inventory that matches and/or relates to the user search request based on the weighting, ranking, and/or rating data. In certain embodiments, the reordered listing of the products and/or inventory is transferred, transmitted, and/or sent to the user, content publisher, or other third party 420. In certain embodiments, the reordered listing of the products and/or inventory is transferred, transmitted, and/or sent to the ranking and/or recommendation module 418.

For example, in response to a user search request for pet dogs, the conversion estimator module 416 can be configured to conduct a search of the database 410 to determine and/or obtain a list of the available pet dogs matching and/or relating to the user search request. For each available pet dog on the resulting and/or generated list, the conversion estimator module 416 can be configured to obtain from the database 410 corresponding weighting, ranking, and/or rating data. Based on the weighting, ranking, and/or rating data, the conversion estimator module 416 can be configured to sort, filter, rank, and/or reorder the listing available pet dogs based on the weighting, ranking, and/or rating data associated with each pet dog. For example, the pet dogs having high weighting, ranking, and/or rating appear at the top of the list. In another example, the pet dog having the highest weighting, ranking, and/or rating appears fourth on the list of because historical data may indicate that a user (and/or users) generally picks the fourth item on the list.

With reference to FIG. 4, the ranking and/or recommendation module 418 may use data from the conversion estimator module 416 and the revenue per conversion database 408 to perform an optional secondary sorting, filtering, ranking, and/or reordering of the search results before sending the results list to the user 420. In certain embodiments, the ranking and/or recommendation module 418 can be configured to determine whether the ranked list should be sorted based on user experience or should be sorted to maximize revenue, wherein the determination can be based on the preference of the content publisher or other third party that initially received the user search request. If the sort order is based on user experience, then the ranked list can be ordered based on the conversion rate, weighting, ranking and/or rating data. If the sort order is based on revenue maximization, the ranking module 418 can be configured to perform a secondary sorting, filtering, ranking, and/or ordering for the product listing by generating a new conversion rate, weighting, ranking and/or rating to be associated with the product. In certain embodiments, the new conversion rate can be derived by multiplying the old conversion rate for each product by the revenue generated and/or the amount paid by the supplier and/or advertiser 402 of the product. The revenue generated and/or the amount paid by the supplier and/or advertiser can be stored in the revenue per conversion database 408. The ranking module 418 can be configured to order the results list based on the new conversion rates for each product, and return the ranked list to the user, content publisher, or other third party 420.

Metadata Extractor Module

Figure 5:
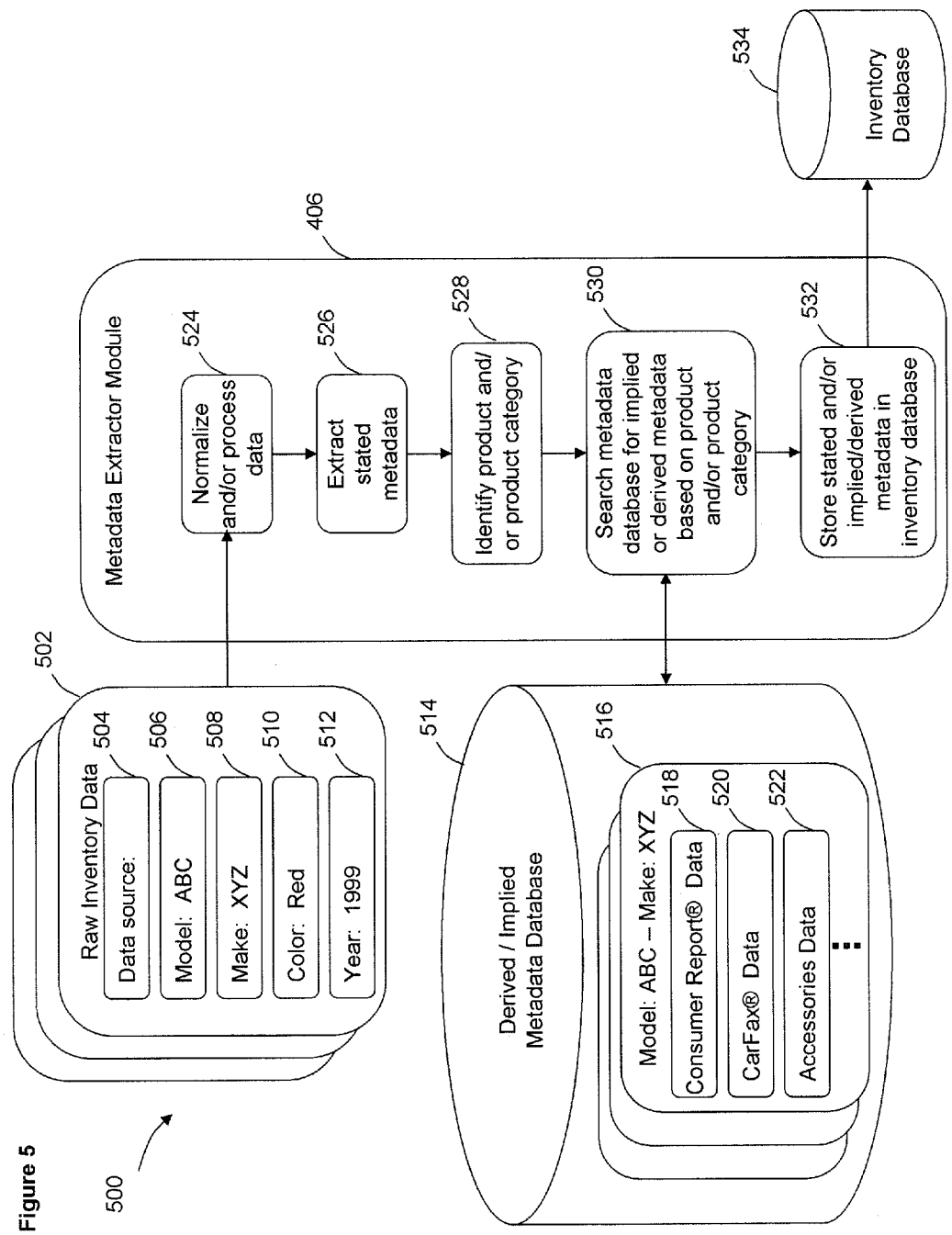
FIG. 5 is one embodiment of a high-level block diagram illustrating a metadata extractor module.

In reference to FIG. 5, a high-level block diagram illustrates one embodiment of a metadata extractor module 406. Depending on the embodiment, certain of the blocks described below may be removed, others may be added, and the sequence of the blocks may be altered.

With reference to FIG. 5, the raw inventory data 502 can be received by the metadata extractor module 406. For example, the raw inventory data can be for a car, which may include without limitation a data source 504, model 506, make 508, color 510, and year 512. In certain embodiments, the raw inventory data 502 can be any kind of product, good, service, item, or other kind of inventory. At block 524, the metadata extractor module 406 can be configured to normalize and/or process the raw data prior to extracting the stated metadata at block 526. The extracted stated metadata may include without limitation, for example, car model 506, make 508, and year 512. From the stated metadata, a product and/or product category corresponding to the data can be identified at block 528. At block 530, the metadata extractor module 406 can be configured to search, mine, locate, obtain, and/or receive, from the derived/implied metadata database 514, implied and/or derived metadata based on the product and/or product category identified and/or determined at block 528. The derived and/or implied metadata may include without limitation, for example, Consumer Report® data 518, CarFax® data 520, and accessories data 522, among many other types or sources of derived/implied metadata discussed herein. At block 532, the metadata extractor module 406 can be configured to store, input, and/or save in the inventory database 534 the stated metadata extracted from the raw inventory data, and/or the implied/derived metadata generated from the derived/implied metadata database, in order for the metadata to be accessible for user searches. In certain embodiments, the inventory database 534 can be part of or can include all or some of the database 410 for inventory, metadata, and/or conversion data.

High-Level Flow Chart

Figure 6:
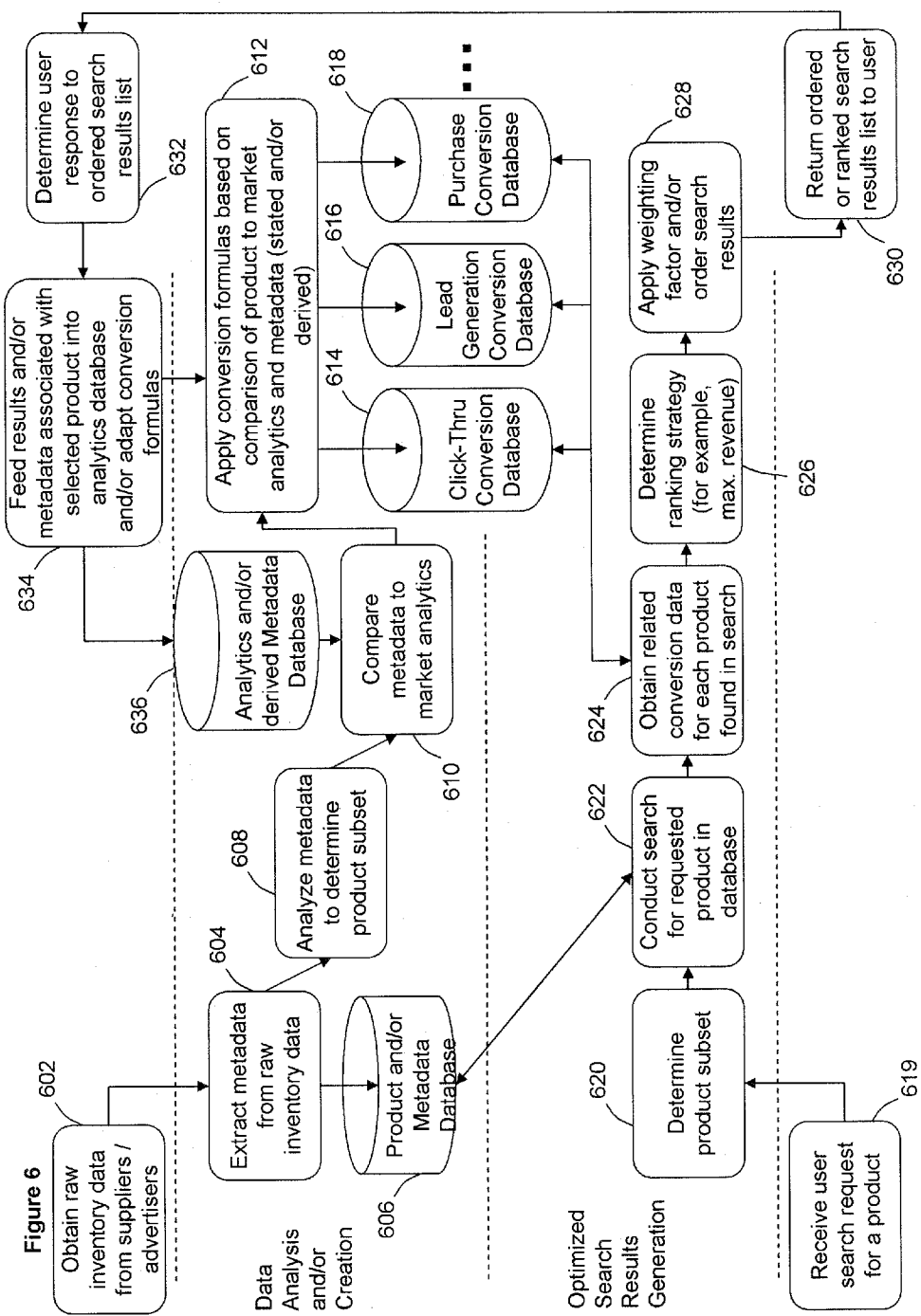
FIG. 6 is one embodiment of a high-level flow-chart depicting one example of data analysis and/or creation, and one example of optimized search results generation.

FIG. 6 illustrates one embodiment of a high-level flowchart depicting one example of data analysis and/or creation, and one example of optimized search results generation, and how these two example systems and methods interact with each other to generate predictive conversion data used to produce optimized search results and/or listings.

With reference to FIG. 6, the data analysis and/or creation process can be initiated at block 602 with the search results optimizer system 403 obtaining, receiving, requesting the raw inventory data from suppliers and/or advertisers. At block 604, the search results optimizer system 403 can be configured to extract stated metadata from the raw inventory data. The search results optimizer system 403 can be configured to store the extracted stated metadata in a product and/or metadata database 606. At block 608, the search results optimizer system 403 can be configured to analyze the stated metadata to determine a product subset (for example, determine the product category). Based on the product subset/category, the search results optimizer system 403, at block 610, can be configured to compare, analyze, process, and/or combine the stated metadata with market analytics and/or derived metadata from database 636. The foregoing process can involve and/or comprise analyzing historical user behavior data associated with user searches related to the product subset/category. At block 612, the search results optimizer system 403 can be configured to apply to each product in the product and/or metadata database 606 conversion formulas (for example, the logistic regression formulas disclosed herein) based on comparison of the product to market analytics and metadata (stated and/or derived). By applying the conversion formulas to each product, a conversion rate, weighting, ranking, or rating can be generated for each product and stored in a database.

For example, the search results optimizer system 403 can be configured to have a conversion formula for analyzing products to determine or generate a predictive value as to whether a user will click-thru and/or click-on a product. In certain embodiments, this predictive value can be stored in a click-thru conversion database 614. In another example, the search results optimizer system 403 can be configured to have a conversion formula for analyzing products to determine or generate a predictive value as to whether a product will likely generate a lead (for example, a sales lead or contact information for sending the user additional information). In certain embodiments, this predictive value can be stored in a lead generation conversion database 616. In another example, the search results optimizer system 403 can be configured to have a conversion formula for analyzing products to determine or generate a predictive value as to whether a user will likely purchase a product. In certain embodiments, this predictive value can be stored in a purchase conversion database 618. In certain embodiments, the databases 614, 616, 618 form one database with separate tables, or are apart of another database, or are separate databases. For those skilled in the art, it will be clear that other conversion formulas can be applied to determine other predictive values.

In reference to FIG. 6, the search results optimizer system 403 can be configured to receive and/or obtain a user search request for a product at block 619. At block 620, the search results optimizer system 403 can be configured to determine and/or identify a product subset based on the search request data. In certain embodiments, the user provides the product subset as part of the search request. At block 622, the search results optimizer system 403 can be configured to conduct a search for the requested product in the product and/or metadata database 606. At block 624, the search results optimizer system 403 can be configured to obtain, retrieve, receive the related conversion data (for example, the predictive values, conversion rate, weighting, ranking, and/or rating) from the databases 614, 616, 618 for each of the products found in the search. In certain embodiments, the conversion data can be obtained from other databases not shown. At block 626, the search results optimizer system 403 can be configured to determine the preferred ranking strategy to be applied. In certain embodiments, the preferred ranking strategy is determined by the content publisher or other third party that initially received the user request. In certain embodiments, the ranking strategy can be based on user experience, which allows the products with the highest conversion rate to appear at the top of the results list. In certain embodiments, the ranking strategy can be based on maximizing revenue, wherein the products that in part generate the most revenue for the conversion are positioned towards the top of the results list. At block 628, the search results optimizer system 403 can be configured to apply the weighting factors so that the search results can be ordered based on the ranking strategy determined at block 626.

At block 630, the search results optimizer system 403 can be configured to return, transmit, and/or send the ordered and/or ranked search results list to the user. In certain embodiments, the user's responses to the ordered search results list (for example, which products and/or items did the user click on, purchase, etc.) are determined at block 632. At block 634, the search results optimizer system 403 can be configured to feed, process, return, and/or input the user responses, results and/or metadata associated with the products selected by the user into the analytics database 636. At block 634, the search results optimizer system 403 can be configured to adapt the conversion formulas applied at block 612 based on the results and/or metadata associated with the products selected by the user.

Computing System

Figure 7:
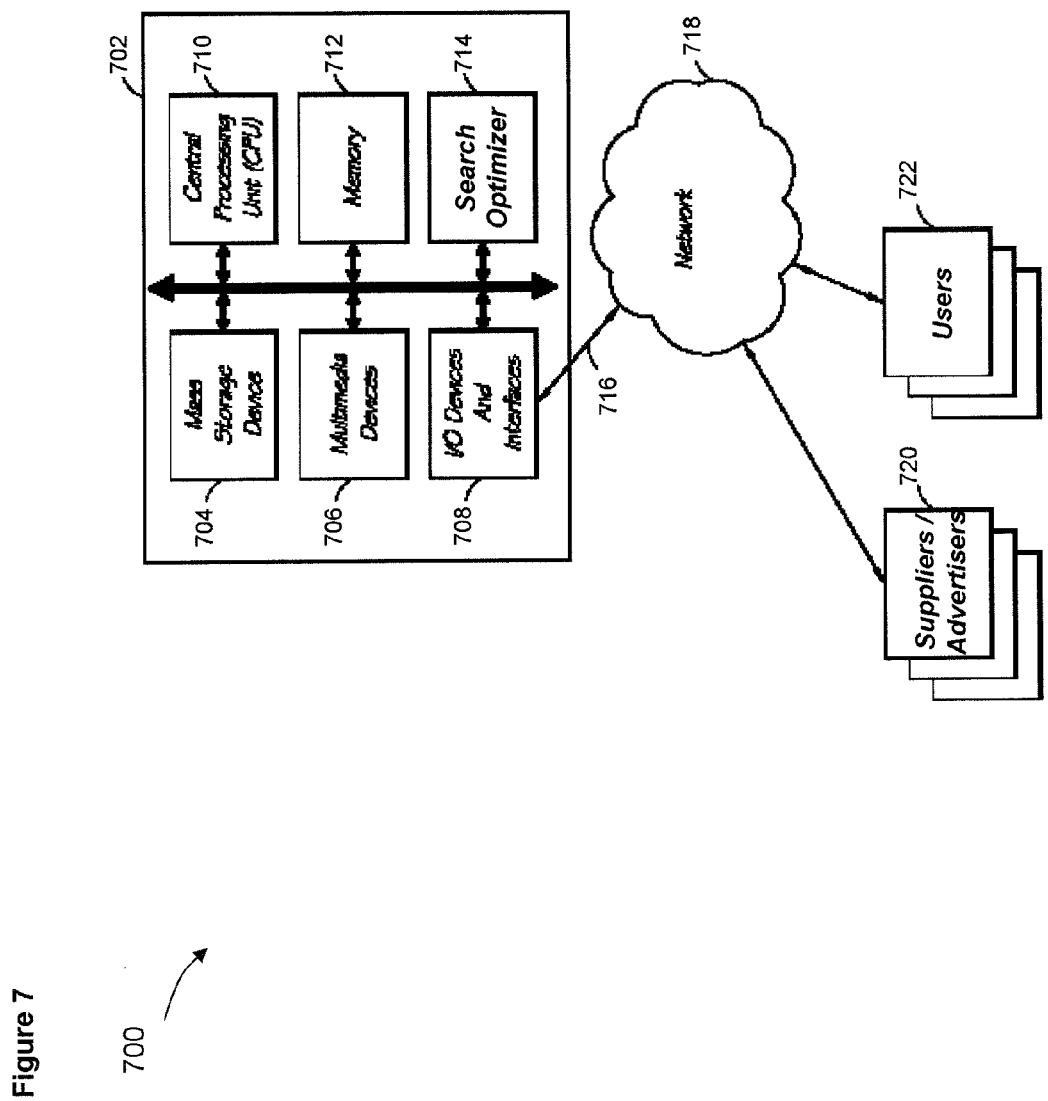
FIG. 7 is a block diagram depicting one embodiment of a computer system configured to run software for implementing one or more embodiments of the search results optimizer system illustrated herein.

FIG. 7 is a block diagram depicting one embodiment of a computer system configured to run software for implementing one or more embodiments of the search results optimizer system illustrated herein.

In some embodiments, the computer clients and/or servers described herein take the form of a computing system 700 shown in FIG. 7, which is a block diagram of one embodiment of a computing system that is in communication with one or more computing systems 403 and/or one or more users 722 via one or more networks 718. The computing system 700 may be used to implement one or more of the systems and methods described herein. In addition, in one embodiment, the computing system 700 may be configured to perform search result optimization based the use of logistic regression analysis involving metadata (stated and/or derived), and historical user behavior. While FIG. 7 illustrates one embodiment of a computing system 700, it is recognized that the functionality provided for in the components and modules of computing system 700 may be combined into fewer components and modules or further separated into additional components and modules.

Client/Server Module

In one embodiment, the computing system 700 comprises a search optimizer module 714 that carries out the functions described herein with reference to the client server systems or the main server system. The search optimizer module 714 may be executed on the computing system 700 by a central processing unit 710 discussed further below.

In general, the word "module," as used herein, refers to logic and/or software embodied in hardware and/or firmware, or embedded in a machine, configured in a special purpose machine, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Computing System Components

In one embodiment, the computing system 700 also comprises a mainframe computer suitable for controlling and/or communicating with large databases, performing high volume transaction processing, and generating reports from large databases. The computing system 700 also comprises a central processing unit ("CPU") 710, which may include without limitation a microprocessor. The computing system 700 further comprises a memory 712, such as random access memory ("RAM") for temporary storage of information and/or a read only memory ("ROM") for permanent storage of information, and a mass storage device 704, such as a hard drive, diskette, or optical media storage device. Typically, the modules of the computing system 700 are in communication with the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 700 comprises one or more commonly available input/output (I/O) devices and interfaces 708, such as a keyboard, mouse, touchpad, and printer. In one embodiment, the I/O devices and interfaces 708 include one or more display devices, such as a monitor, that allows the visual presentation of data to a user. More particularly, a display device provides for the presentation of GUIs, application software data, and multimedia presentations, for example. In the embodiment of FIG. 7, the I/O devices and interfaces 708 also provide a communications interface to various external devices. The computing system 700 may also include one or more multimedia devices 706, such as speakers, video cards, graphics accelerators, and microphones, for example.

Computing System Device/Operating System

The computing system 700 may run on a variety of computing devices, such as, for example, a server, a Windows server, an Structure Query Language server, a Unix server, a personal computer, a mainframe computer, a laptop computer, a cell phone, a personal digital assistant, a kiosk, an audio player, and so forth. The computing system 700 is generally controlled and coordinated by operating system software, such as z/OS, Windows 95, Windows 98, Windows NT, Windows 2000, Windows XP, Windows Vista, Linux, BSD, SunOS, Solaris, or other compatible operating systems. In Macintosh systems, the operating system may be any available operating system, such as MAC OS X. In other embodiments, the computing system 700 may be controlled by a proprietary operating system. The operating systems control and schedule computer processes for execution, perform memory management, provide file system, networking, and I/O services, and provide a user interface, such as a graphical user interface ("GUI"), among other things.

Network

In the embodiment of FIG. 7, the computing system 700 is coupled to a network 718, such as a LAN, WAN, or the Internet, for example, via a wired, wireless, or combination of wired and wireless, communication link 716. The network 718 communicates with various computing devices and/or other electronic devices via wired or wireless communication links. In the embodiment of FIG. 7, the network 718 is communicating with one or more suppliers and/or advertisers 720, and/or one or more users 722.

Access to the search optimizer module 714 of the computer system 700 by suppliers and/or advertisers 720 and/or by users 722 may be through a web-enabled user access point such as suppliers and/or advertisers' 720 or users' 722 personal computer, cellular phone, laptop, or other device capable of connecting to and/or communicating with the network 718. Such a device may have a browser module is implemented as a module that uses text, graphics, audio, video, and other media to present data and to allow interaction with data via the network 718. The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 708 and may also include without limitation software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user. The input device(s) may include without limitation a keyboard, roller ball, pen and stylus, mouse, trackball, voice recognition system, or pre-designated switches or buttons. The output device(s) may include without limitation a speaker, a display screen, a printer, or a voice synthesizer. In addition a touch screen may act as a hybrid input/output device. In another embodiment, a user may interact with the system more directly such as through a system terminal connected to and/or in communication with the score generator without communications over the Internet, a WAN, or LAN, or similar network.

In some embodiments, the computing system 700 may include without limitation a physical or logical connection established between a remote microprocessor and a mainframe host computer for the express purpose of uploading, downloading, or viewing interactive data and databases on-line in real time. The remote microprocessor may be operated by an entity operating the computer system 700, including without limitation the client server systems or the main server system, an/or may be operated by one or more of the users 722 and/or one or more of the computing systems. In some embodiments, terminal emulation software may be used on the microprocessor for participating in the micro-mainframe link.

In some embodiments, suppliers and/or advertisers 720 who are internal to an entity operating the computer system 700 may access the search optimizer module 714 internally as an application or process run by the CPU 710.

User Access Point

In one embodiment, a user access point comprises a personal computer, a laptop computer, a cellular phone, a GPS system, a Blackberry® device, a portable computing device, a server, a computer workstation, a local area network of individual computers, an interactive kiosk, a personal digital assistant, an interactive wireless communications device, a handheld computer, an embedded computing device, or the like.

Other Systems

In addition to the systems that are illustrated in FIG. 7, the network 718 may communicate with other data sources or other computing devices. The computing system 700 may also include one or more internal and/or external data sources. In some embodiments, one or more of the data repositories and the data sources may be implemented using a relational database, such as DB2, Sybase, Oracle, Code- Base and Microsoft® SQL Server as well as other types of databases such as, for example, a flat file database, an entity-relationship database, and object-oriented database, and/or a record-based database.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the foregoing systems and methods have been described in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. While certain embodiments of the inventions have been described, these embodiments have been presented by way of example only, and are not intended to limit the scope of the inventions. Indeed, the novel methods and systems described herein may be embodied in a variety of other forms without departing from the spirit thereof. Further, the disclosure herein of any particular feature in connection with an embodiment and/or example can be used in all other disclosed embodiments and/or examples set forth herein. Accordingly, other combinations, omissions, substitutions and modifications will be apparent to the skilled artisan in view of the disclosure herein.

What is claimed is:

1. A computer-implemented method of generating and presenting interactive search results, the method comprising:
   providing, by a computer system, a user interface that comprises functionality that enables a user to interactively search for and select items;
   maintaining, by the computer system, one or more electronic data stores that store information relating to a plurality of items each comprising a plurality of attributes and a category, the stored information comprising predicted conversion factors each configured to indicate a predicted likelihood of conversion of one of the plurality of items;
   accessing, by the computer system via a computer network, a plurality of network-accessible feeds to obtain information related to the plurality of items;
   generating, by the computer system, metadata based on the information obtained from the plurality of network-accessible feeds, the metadata comprising Uniform Resource Locators (URL's) for webpages at which the plurality of items are for sale,
   wherein the metadata further comprises stated metadata and derived metadata, the stated metadata comprising attributes obtained from item descriptions provided by a source or promoter of items relating to the item descriptions, the derived metadata comprising attributes obtained from a third party source,
   database-linking, in an electronic data store, the generated metadata to the plurality of items;
   generating, by the computer system, the predicted conversion factors by inputting the generated metadata into a logistic regression formula, the logistic regression formula generated based at least in part on an analysis of historical conversion activity and stated metadata and derived metadata related to attributes associated with items different than the plurality of items to determine statistically how each attribute associated with the items different than the plurality of items affected the historical conversion activity, the logistic regression formula configured to apply a result of the analysis to the inputted metadata to output the predicted conversion factors,
   wherein the items different than the plurality of items comprise a same category as the plurality of items but comprise one or more different attribute values;
   receiving, by the computer system, a user search request generated via the user interface, the user search request comprising an item search criteria;
   searching, by the computer system, the one or more electronic data stores for a plurality of items relating to the item search criteria;
   generating, by the computer system, for the user a personalized user interface data that provides functionality for the user to select from a result set of items based on the searching, the result set being prioritized based on the predicted conversion factors;
   causing, by the computer system, rendering of a search results output, based on the personalized user interface data, the search results output presents the prioritized result set and enables interaction with, by the user, the plurality of items relating to the item search criteria;
   electronically monitoring, by the computer system, over a computer network, user interactions with the search results output to determine a user response to the search results output, the user response comprising at least a selection of a URL associated with an item;
   adapting, by the computer system, the logistic regression formula based on the user response, the adapting comprising at least including an indication of the selection of the URL in the historical conversion activity analyzed to generate the logistic regression formula;
   regenerating, by the computer system, one or more of the predicted conversion factors by inputting the generated metadata into the adapted logistic regression formula;
   receiving, by the computer system, a second search request that comprises the item search criteria; and
   generating, by the computer system, a second result set of items based on the second search request, the second result set comprising a different prioritization based at least in part on the regenerated predicted conversion factors,
   wherein the computer system comprises one or more physical servers.

2. The computer-implemented method of claim 1, wherein the item search criteria comprises a product category.

3. The computer-implemented method of claim 1, further comprising:
   analyzing, by the computer system, the user search request in conjunction with historical data to determine one or more characteristics of the user search request.

4. The computer-implemented method of claim 3, wherein analyzing the user search request in conjunction with the historical data comprises applying a regression analysis.

5. The computer-implemented method of claim 3, wherein the historical data comprises conversion data.

6. The computer-implemented method of claim 3, wherein the one or more characteristics of the user search request are associated with item characteristics correlated with an increased likelihood of conversion.

7. The computer-implemented method of claim 1, wherein the one or more electronic data stores comprise one or more of the following: a relational database, a flat file database, an entity-relationship database, an object-oriented database, a record-based database, a distributed database.

8. A computer-implemented method of generating and presenting interactive search results, the method comprising:
   receiving, by a computer system, via a plurality of network-accessible feeds, data relating to a plurality of items each comprising a plurality of attributes and a category;
   generating, by the computer system, metadata based on the data received via the plurality of network-accessible feeds, the metadata comprising Uniform Resource Locators (URL's) for webpages at which the plurality of items are for sale,
   wherein the metadata further comprises stated metadata and derived metadata, the stated metadata comprising attributes obtained from item descriptions provided by a source or promoter of items relating to the item descriptions, the derived metadata comprising attributes obtained from a third party source,
   database-linking, in an electronic data store, the generated metadata to the plurality of items;
   calculating, by the computer system, predicted conversion factors for the plurality of items, the predicted conversion factors calculated at least in part by inputting the stated metadata and the derived metadata into a logistic regression formula, the logistic regression formula generated based at least in part on an analysis of historical conversion activity and stated metadata and derived metadata related to attributes associated with items different than the plurality of items to determine statistically how each attribute associated with the items different than the plurality of items affected the historical conversion activity, the logistic regression formula configured to apply a result of the analysis to the inputted metadata to output the predicted conversion factors,
   wherein the items different than the plurality of items comprise a same category as the plurality of items but comprise one or more different attribute values;
   providing, by the computer system, a user interface that comprises functionality that enables a user to interactively search for and select items;
   receiving, by the computer system, a user search request generated via the user interface, the user search request comprising an item search criteria;
   searching, by the computer system, the electronic data store for a plurality of items relating to the item search criteria;
   generating, by the computer system, a result set of items based on the searching, the result set being prioritized based on the predicted conversion factors;
   causing, by the computer system, rendering of a search results output that presents the prioritized result set and enables interaction with, by the user, the plurality of items relating to the item search criteria;
   electronically monitoring, by the computer system, over a computer network, user interactions with the search results output to determine a user response to the search results output, the user response comprising at least a selection of a URL associated with an item;
   adapting, by the computer system, the logistic regression formula based on the user response, the adapting comprising at least including an indication of the selection of the URL in the historical conversion activity analyzed to generate the logistic regression formula;
   regenerating, by the computer system, one or more of the predicted conversion factors by inputting the generated metadata into the adapted logistic regression formula;
   receiving, by the computer system, a second search request that comprises the item search criteria; and
   generating, by the computer system, a second result set of items based on the second search request, the second result set comprising a different prioritization based at least in part on the regenerated predicted conversion factors,
   wherein the computer system comprises one or more physical servers.

9. The computer-implemented method of claim 8, wherein the data relating to the plurality of items is provided by a source or promoter of the plurality of items.

10. The computer-implemented method of claim 8, wherein the item search criteria comprises a product category.

11. The computer-implemented method of claim 8, further comprising:
   analyzing, by the computer system, the user search request in conjunction with historical data to determine one or more characteristics of the user search request.

12. The computer-implemented method of claim 11, wherein analyzing the user search request in conjunction with the historical data comprises applying a regression analysis.

13. The computer-implemented method of claim 11, wherein the historical data comprises conversion data.

14. The computer-implemented method of claim 11, wherein the one or more characteristics of the user search request are associated with item characteristics correlated with an increased likelihood of conversion.

15. The computer-implemented method of claim 8, wherein the one or more electronic data stores comprise one or more of the following: a relational database, a flat file database, an entity-relationship database, an object-oriented database, a record-based database, a distributed database.

* * * * *